Feb. 3, 1931.    F. DE LAUTOUR    1,790,799
FOUR-STROKE CYCLE INTERNAL COMBUSTION ENGINE
Filed June 22, 1928    2 Sheets-Sheet 1
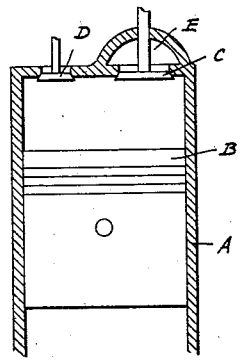
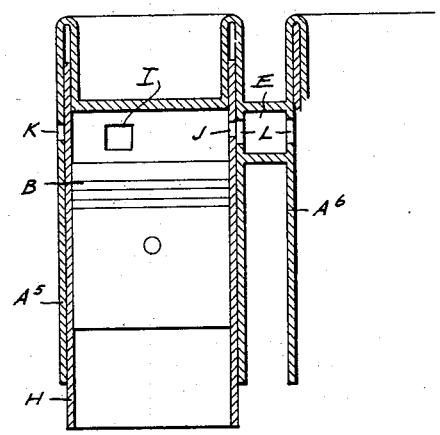
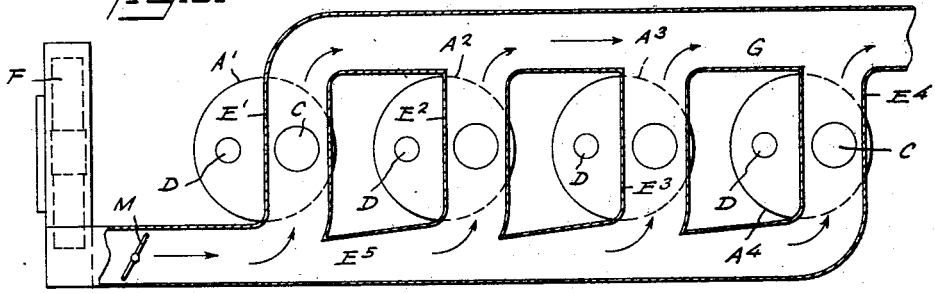
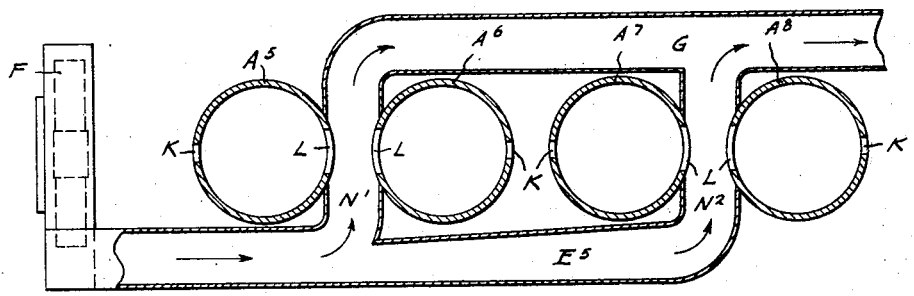
INVENTOR
FRANCIS DE LAUTOUR
BY
ATTORNEY

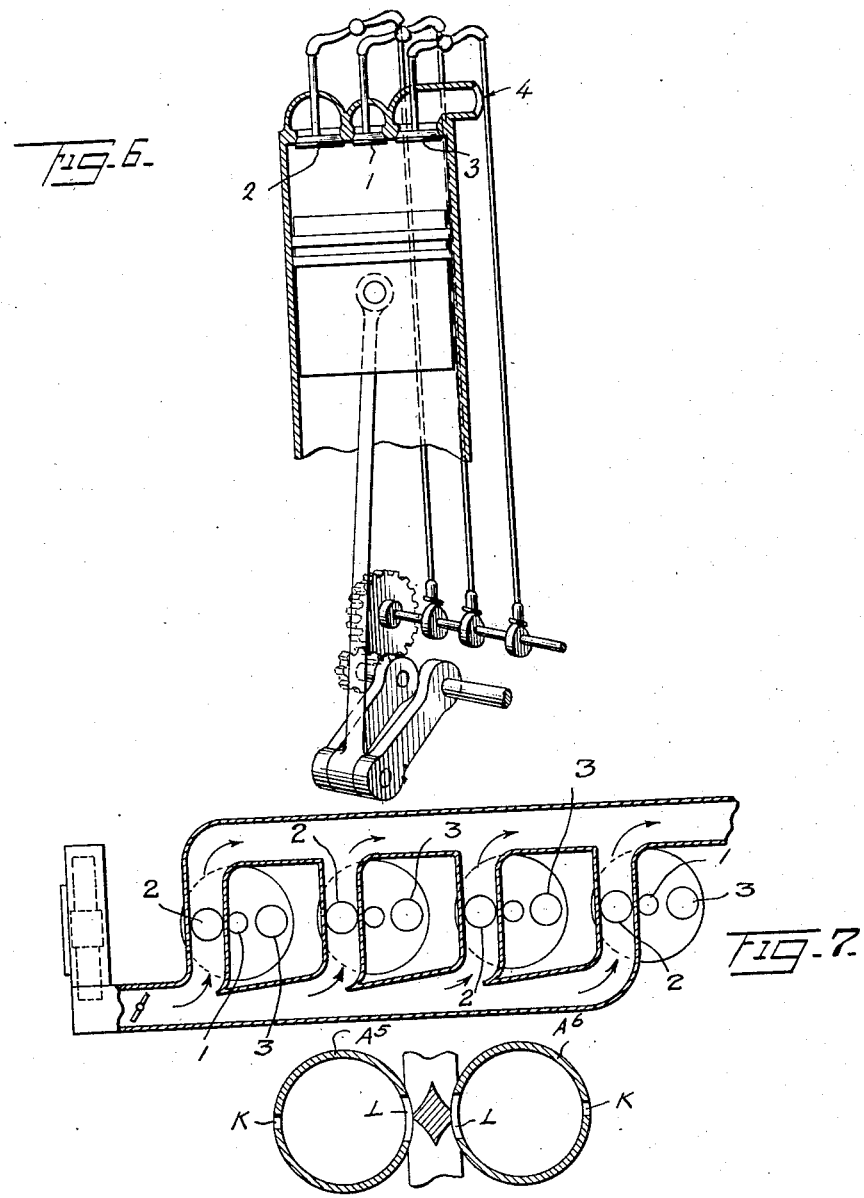

Patented Feb. 3, 1931

1,790,799

UNITED STATES PATENT OFFICE

FRANCIS DE LAUTOUR, OF WELLINGTON, NEW ZEALAND

FOUR-STROKE-CYCLE INTERNAL-COMBUSTION ENGINE

Application filed June 22, 1928, Serial No. 287,404, and in Great Britain September 12, 1927.

My invention relates to internal combustion engines of the four-stroke cycle type.

One object of my invention is to provide improved means for the admission of air to the cylinder from a passage through which air is continuously passed.

A further object of my invention is to provide a single valve for the escape of exhaust gases and for the admission of air and to provide a passage for the continuous supply of air past the back of such valve.

A still further object is the provision of means whereby a swirling motion is given to the air supplied to the cylinder.

According to my invention a passage is provided at the head of each cylinder and is in direct communication with the exhaust pipe and is constantly traversed by a current of air at high velocity, forced or induced by a pump or fan.

A valve provided in the passage, when open, allows the air to enter the combustion space of the cylinder and the same valve allows the exhaust gases to flow into the passage whence they are led directly to the exhaust pipe or to the atmosphere. The said valve is open during the exhaust stroke and also during the time at which the air for combustion is admitted to the cylinder.

The fuel charge is separately supplied either before or during the compression stroke of the engine.

The air admission and exhaust valve is positioned eccentrically with respect to the axis of the cylinder in such a position that the admitted air is deflected to the wall of the cylinder and is set into swirling motion.

In the ordinary arrangement of internal combustion engines difficulty arises in opening and closing the valves of comparatively large lift with sufficient rapidity, but the relatively long period during which the air admission and exhaust valve is open in the present invention obviates this difficulty.

The arrangement according to the invention is particularly adapted for use with engines described in my prior Patent No. 1,680,505, dated August 14, 1928, in which the fuel gases are expanded during the suction stroke and by the whirling motion set up on entering the cylinders are deflected against the cylinder wall from which they absorb heat during the process of expansion.

The accompanying drawing illustrates diagrammatically means for exhausting the combustion products and admitting air for combustion according to the invention for four-stroke cycle internal combustion engines.

Fig. 1 is a vertical section of a cylinder provided with fuel inlet and exhaust valves of the poppet type;

Fig. 2 is a plan of the air inlet and exhaust ducts of a multi-cylinder engine with poppet valves;

Fig. 3 is a vertical section of part of a multi-cylinder engine provided with sleeve valves;

Fig. 4 is a plan showing the inlet and exhaust ducts of the multi-cylinder engine with sleeve valves;

Fig. 5 shows a detail of the air admission; and

Fig. 6 shows an engine with a modified arrangement of valves.

Fig 7 is a plan view of a multi-cylinder engine having the same modified arrangement of valves.

Referring to Fig. 1, A is the cylinder wall, B the piston, C the exhaust and air admission valve, D the fuel inlet valve and E the passage through which a current of air is forced or induced by a pump or fan of any suitable type.

In Fig. 2 the air supplied by the pump F flows through the common duct $E^5$, and through the branch ducts $E^1$, $E^2$, $E^3$, $E^4$, over the heads of the cylinders $A^1$, $A^2$, $A^3$, $A^4$, and into the common exhaust duct G. During the exhaust stroke of each cylinder the valve C is open and the products of combustion are carried to the duct G by the air current passing through the branch duct; and during the suction stroke (or at least a portion thereof) the valve C remains open to permit the admission of air from the said branch duct to the cylinder.

The eccentric position of the valves C with respect to the axes of the cylinders and the arrangement of the branch ducts causes a swirling motion to be imparted to the air which causes it to flow in contact with the walls of the cylinders.

A valve M in the duct $E^5$ enables the flow of air to be stopped at any time.

Referring to Figs. 3 and 4, sliding sleeves H have fuel inlet ports I and air inlet ports J; while K and L represent the corresponding ports in the cylinder walls A.

The adjacent pair of cylinders $A^5$, $A^6$ and $A^7$, $A^8$ are supplied by a branch duct $N^1$ or $N^2$, since the air inlet ports would not be open in the adjacent cylinders at the same time.

A blocking member can be inserted in the air duct opposite the air port of a cylinder, so that the air enters the port in the sleeve valve on one side of a block and leaves the port on the other side of the block.

Fig. 5 shows a block O as provided in the common duct between two adjacent cylinders.

An auxiliary exhaust valve with separate exhaust passage may, if it is found desirable, be provided in order to obtain a very quiet exhaust. The valve would be arranged to open immediately before the main exhaust valve and might be operated by the same cam and levers.

Fig. 6 shows an engine having a fuel supply valve 1, a valve 2 for the escape of the exhaust gases and for the admission of air, and an auxiliary exhaust valve 3 adapted to open immediately before the said valve 2 and communicating with a separate exhaust passage 4.

Fig. 7 shows a multi-cylinder engine having an arrangement of valves 1, 2, and 3 similar to that shown at Fig. 6.

What I claim is:—

1. A four-stroke multi-cylinder internal combustion engine, comprising an air passage, an exhaust pipe, a plurality of air ducts extending between the said passage and pipe, means for continuously passing a high velocity current of air through said passage, ducts and pipe and a valve for each cylinder for controlling communication between the cylinder and the adjacent duct and located so as to deflect towards the cylinder walls air admitted to the cylinder from the duct.

2. A four-stroke multi-cylinder internal combustion engine, comprising an air passage, an exhaust pipe, a plurality of air ducts extending between the said passage and pipe, a fan for continuously passing a current of air at a high velocity through said passage, ducts and exhaust pipe, and valves for controlling communication between the cylinders and the said ducts, and for deflecting admitted air against the internal side walls of the cylinders.

3. A four-stroke cycle internal combustion engine comprising a cylinder, an air passage adjacent thereto, a single valve for controlling the exhaust of the combustion gases to said passage and the admission of air to said cylinder, and an auxiliary valve for the exhaust of the combustion gases from the cylinder.

4. A four-stroke cycle internal combustion engine comprising a cylinder, an air passage adjacent thereto, a single valve for controlling the exhaust of the combustion gases to said passage and the admission of air to said cylinder, an auxiliary exhaust passage, and an auxiliary exhaust valve opening into the latter passage and adapted to open immediately before the first mentioned valve.

In testimony whereof I have signed my name to this specification.

FRANCIS DE LAUTOUR.